(12) United States Patent
Newton et al.

(10) Patent No.: US 8,219,652 B2
(45) Date of Patent: Jul. 10, 2012

(54) CLIENT APPLICATION INSTALLER

(75) Inventors: Gregory Patrick Newton, Lithia Springs, GA (US); Ryan Robert Dawe, Atlanta, GA (US); Jonathan Aubrey Harmer, Atlanta, GA (US)

(73) Assignee: Cbeyond Communcations, LLC, Atlanta, GA (US)

( * ) Notice: Subject to any disclaimer, the term of this patent is extended or adjusted under 35 U.S.C. 154(b) by 160 days.

(21) Appl. No.: 12/369,185

(22) Filed: Feb. 11, 2009

(65) Prior Publication Data

US 2010/0205284 A1   Aug. 12, 2010

(51) Int. Cl.
*G06F 15/177* (2006.01)

(52) U.S. Cl. ........ 709/221; 709/222; 709/220; 709/223; 709/227; 709/230

(58) Field of Classification Search ............. 709/221, 709/222, 220, 223, 227, 230
See application file for complete search history.

(56) References Cited

U.S. PATENT DOCUMENTS

| | | | |
|---|---|---|---|
| 5,805,897 A | 9/1998 | Glowny | |
| 6,493,871 B1 | 12/2002 | Welch et al. | |
| 6,996,815 B2 | 2/2006 | Bourke-Dunphy et al. | |
| 2002/0082858 A1* | 6/2002 | Heddaya et al. | 705/1 |
| 2005/0262501 A1 | 11/2005 | Marinelli et al. | |
| 2006/0085860 A1* | 4/2006 | Zou et al. | 726/26 |
| 2008/0271061 A1* | 10/2008 | Branson et al. | 719/328 |
| 2008/0288597 A1* | 11/2008 | Christensen et al. | 709/206 |
| 2009/0037835 A1* | 2/2009 | Goldman | 715/771 |
| 2009/0125990 A1* | 5/2009 | Streefland | 726/5 |

FOREIGN PATENT DOCUMENTS

EP    1855198 A1 * 11/2007

* cited by examiner

*Primary Examiner* — Lan-Dai T Truong
(74) *Attorney, Agent, or Firm* — Fish & Richardson P.C.

(57) ABSTRACT

Methods, systems, and apparatus, including computer program products, for installing client application. In one aspect, a method includes receiving user identification data at the client device, determining a client application configuration based on the user identification data, and configure a client application on the client device according to the specified client application configuration.

18 Claims, 4 Drawing Sheets

CLIENT APPLICATION INSTALLER

BACKGROUND

This specification relates to installing applications on client devices.

Business entities require both telecommunication access and Internet access to operate efficiently. Often the telecommunication access can be implemented by use of voice over IP ("VoIP") platforms. However, many business entities—particularly small business entities—do not have the technical expertise and/or financial resources to establish and maintain communication systems that provide broadband voice and data capabilities. These business entities thus often enter into agreements with custom providers of voice and broadband Internet services. One such provider is CBeyond, Inc., of Atlanta, Ga., USA, which provides customized packages and support for broadband voice and Internet access to enterprises. The customized packages can include a variety of Internet/data services, voice services, security services, remote access services, and mobile services. Examples of such services can include web hosting and domain services, mail server hosting, local and long-distance phone services, voicemail, firewalls, file sharing and secured file backup, to name just a few.

To provide these services for an enterprise, representatives of the provider will install one or more client applications on client devices (e.g., personal computers) located at the enterprise premises. Each client device may receive different client application installations and configurations, depending on the services that the enterprise has chosen to receive, and on restrictions of services to particular persons in the enterprise. Furthermore, many client devices may already have preinstalled client applications that provide the functionality the services require. Accordingly, configuring each client device according to the services available to the user of the client device while minimizing the installation of client applications that provide the same functionality of preinstalled client applications can be a labor-intensive process.

SUMMARY

In general, one aspect of the subject matter described in this specification can be embodied in methods that include receiving user identification data at the client device, the user identification data specifying a user identifier; sending the user identification data to an authentication server; receiving configuration specification data from the authentication server, the configuration specification data specifying a client application configuration associated with user identification data; and determine whether the specified client application configuration is a first configuration or a second configuration. In response to determining that the specified client application configuration is the first configuration, installing and configuring a first client application on the client device. In response to determining that the specified client application configuration is the second configuration, determining whether the client device has a supported client application installed on the client device, the supported client application having the same functionality of the first client application. In response to determining that the client device has a supported second client installed on the client device, configure the supported second application on the client device; and in response to determining that the client device does not have a supported second client application installed on the client device, providing user instructions to configure a plurality of second client applications. Other embodiments of this aspect include corresponding systems, apparatus, and computer program products.

These and other embodiments can optionally include one or more of the following features. An authentication service can receive the identification data transmitted from the client device; authenticate the user identifier specified by the identification data and select an associated client application configuration in response to authenticating the user identifier; generate the configuration specification data specifying a client application configuration associated with user identification data; and send the configuration specification data to the client device.

Optionally, in response to determining that the client device does not have a supported second client application installed on the client device, the first client application can be installed and configured on the client device.

Particular embodiments of the subject matter described in this specification can be implemented to realize one or more of the following advantages. Provisioning of configuration data simplifies installation of client applications on client devices. A common application installation utility can be used to install a client application or configure one or more existing client applications on a client device. The installation of the client application can be predicated on the user of the client device being authorized for a complete client configuration. The configuration of one or more existing client applications can be predicated on the user of the client device only being authorized for a basic configuration, and the configuration of existing client applications can minimize the use of per-seat licenses and minimize the installation of client software having redundant functionality.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
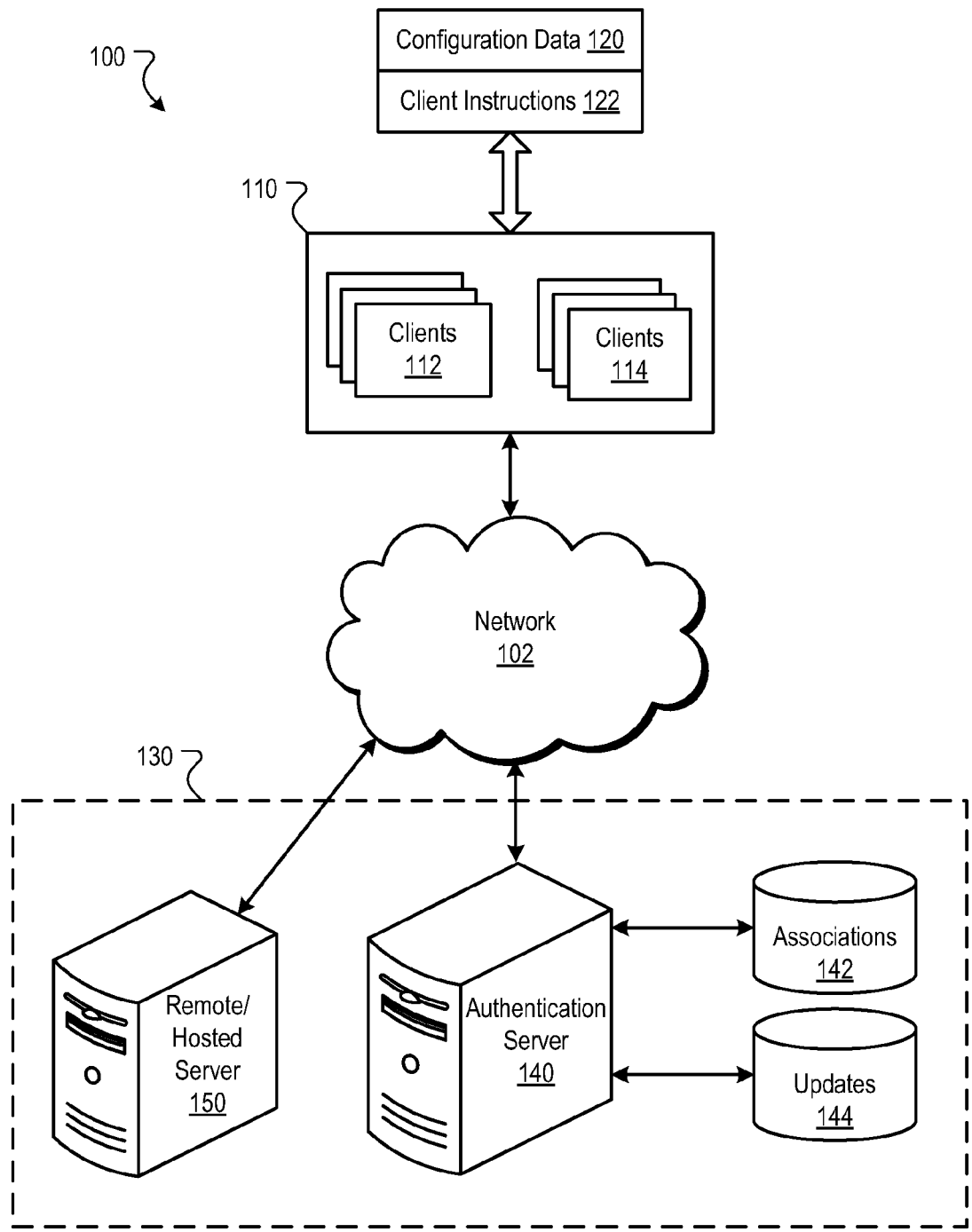
FIG. 1 is an environment in which a client application installer is used.

FIG. 1 is an environment 100 in which a client application installer is used. A computer network 102, such as the Internet, connects an enterprise 110, such as a business entity, and an authentication server 130. The enterprise 110 includes a plurality of first client devices 112 and second client devices 114. A client device is an electronic device that is under control of a user and is capable of requesting and receiving data over the network 102. Example client devices include personal computers, mobile communication devices, and other devices that can send and receive data over the network 102.

The enterprise 110 has contracted with a broadband voice and data service provider 130 to receive broadband voice and data services over the network 102. According to the needs of particular users in the enterprise 110, the client devices 112 and 114 may have different client applications installed and different configurations of those client applications. Installation of these different applications and different configurations of the client devices 112 and 114 are facilitated by configuration data 120 and client instructions 122.

The configuration data 120 are used to configure client applications according to a plurality of client application configurations. Each client application configuration is associated with a corresponding user identifier. For example, depending on the service package purchased by the enterprise 110, a user identifier may be associated with either a complete configuration or a basic configuration. In some implementations, a complete configuration results in an installation of a particular mail client application, e.g., Microsoft Outlook 2007, on an associated client device, and the mail client application is configured for an account on mail server 150 hosted by the provider. This installation and configuration occurs regardless of whether there are other mail client applications installed on an associated client device.

Conversely, a basic configuration results in a determination of whether a supported mail client application is currently installed on the associated client device. If a supported mail client application is currently installed on the associated client device, the supported mail client application is configured with a mail account for the mail server 150 hosted by the provider 130. However, if a supported mail client application is not currently installed on the associated client device, the user of the client device is provided instructions for manual configuration of mail client applications to communicate with the mail server 150.

The client instructions 122 are executable by the client devices, and operable to cause the client devices to send user identification data that specify a user identifier to an authentication server 140, receive configuration specification data in response, and install and or configure client applications as described above.

In some implementations, the configuration data 120 and the client instructions 122 are encoded on a computer readable medium that is accessed by each of the client devices 112 and 114. For example, the configuration data 120 and the client instructions 122 can be included on a DVD or CD-ROM. In other implementations, the configuration data 120 and the client instructions 122 can be stored in the data store at the authentication server 140, and provided to each of the client devices 112 and 114 during an installation and configuration process.

In some implementations, installation files for installing the client applications can be included in the configuration data 120. In other implementations, the installation files can be stored at the authentication server 140, and provided to each of the client devices 112 and 114 during the installation and configuration process.

The authentication server 140 is used to authenticate user identification data provided by the client devices 112 and 114, and to generate and send configuration specification data to the client devices 112 and 114. For example, the authentication server 140 receives the user identification data transmitted from the client device and authenticates the user identifier specified by the user identification data. In some implementations, the authentication server 140 authenticates the user identifier by checking an association data store 142. The association data store 142 stores associations of user identifiers and configuration types for authorized user identifiers.

These associations are established, for example, when the enterprise 110 sets up its service agreement with the provider 130. For example, a small enterprise may have only 20 employees, and may already own twenty client devices, each of which have a preinstalled mail client. Rather than incurring the cost of 20 licenses for new mail client, the enterprise 110 may specify only basic configurations of its existing mail client applications. As a result, each of the mail client applications may be configured with a basic mail account associated with a mail server 150 hosted by the provider 130. Alternatively, the enterprise may decide that a complete installation of a new mail client is needed, e.g., the enterprise may desire to use calendar features, global address book features, shared contact features, etc., that may not be available with a pre-existing mail client applications installed on the client devices. Accordingly, each of the clients of the enterprise may be configured according to complete configuration.

In the implementations in which the configuration data 120 and the client instructions 122 are encoded on a DVD or CD-ROM, the client instructions 122 may request updates from the authentication server 140 before initiating installations and or configurations. For example, a client application that is to be installed according to a complete configuration may have been recently updated, e.g., a new patch may have been released. As a result, client installation files stored on the DVD or CD-ROM may be out of date. Files for these updates can be stored in an update store 144, and the necessary updated installation files can be provided to the client device if needed.

Processes for installing a configuring client applications in client devices are describe more fully with respect to FIGS. 2 and 3 below.

Figure 2:
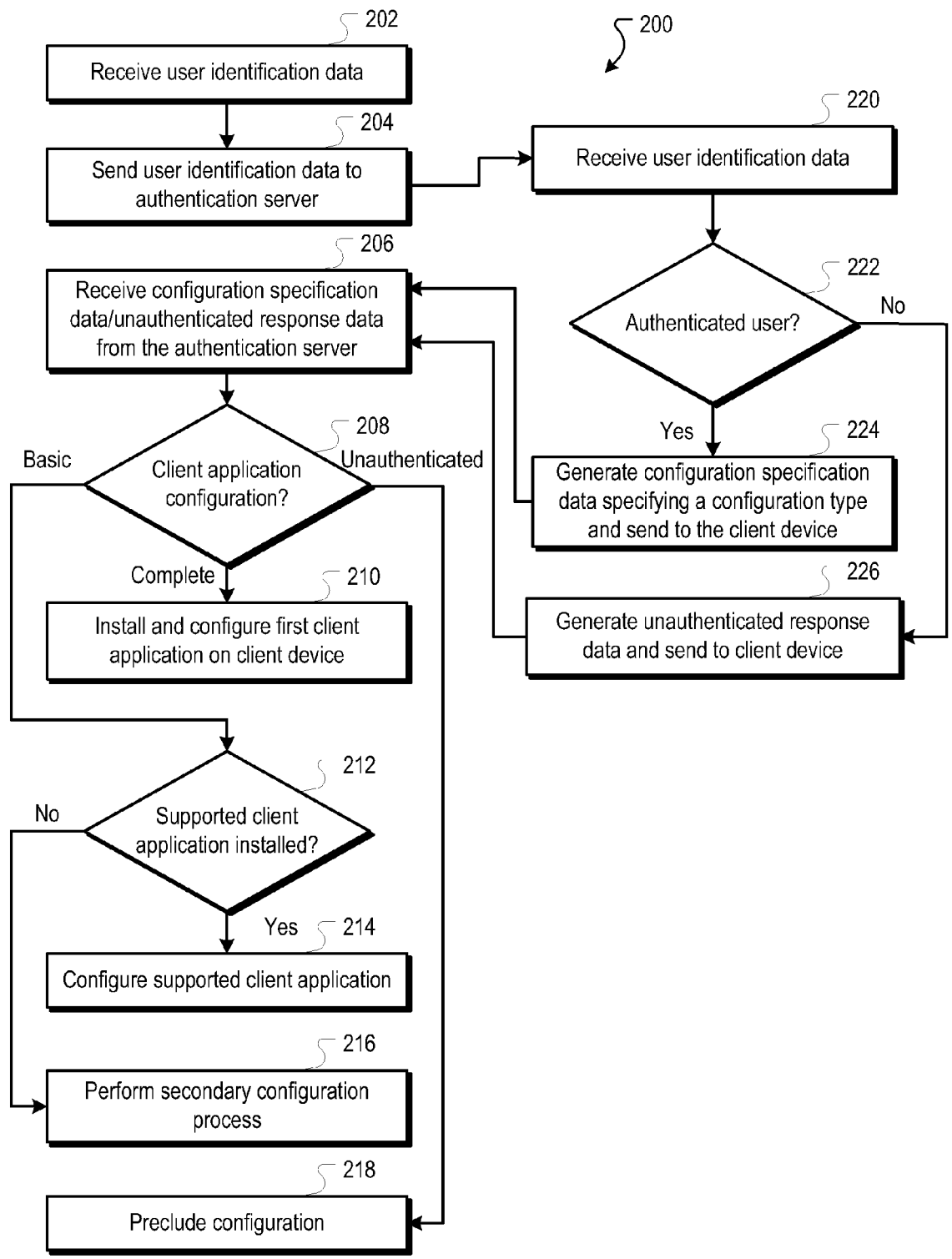
FIG. 2 is a flow diagram of an example process for installing client applications on a client device.

FIG. 2 is a flow diagram of an example process 200 for installing client applications on a client device. Portions of the process 200 take place on a client device, i.e., the process blocks on the left-hand side of the page, while other portions of the process 200 take place on an authentication server, the process blocks on the right-hand side of the page.

User identification data is received (202). For example, an employee of the provider 130, or an employee of the enterprise 110, may initiate an installation and configuration process using the configuration data 120 and the client instructions 122. Upon initiating installation process, the client device prompts the user for user identification data. This user identification data can be a unique password and identifier associated with the user, such as an e-mail address and a default password.

The user identification data is sent to an authentication server (204). For example, the client instructions 122 calls client device to transmit the user identification data to the authentication server 140.

At the authentication server, the user identification data is received from the client device (220). The authentication server that determines whether the user identification data identifies an authenticated user (222). For example, the authentication server can check the association data store 142 to determine whether the user identifier specified by the user authentication data is an authorized identifier.

In response to a positive determination, the authentication server generates configuration specification data, and sends the configuration specification data to the client device (224). The configuration identification data specifies a client application configuration associated with the user identifier. For example, the association data store 142 can specify whether a user identifier is associated with a first configuration type, e.g., a complete configuration, or a second configuration type, e.g., a basic configuration. This configuration type can be represented in the configuration specification data.

In response to the negative determination, the authentication server 140 generates unauthenticated response data and sends the unauthenticated response data to the client device. The unauthenticated response data specifies that the user identification data is either not found in the association data store 142, or that no configuration is specified for the user identifier that is found in the association data store 142.

The configuration specification data (or unauthenticated response data) is received at the client device (206), and a client application configuration type is determined (208). For example, the client instructions 122, executing on the client device, cause the client device to determine whether the received data specify a basic configuration, a complete configuration, or an unauthenticated user identifier.

If a complete configuration is specified, a first client application is installed and configured on the client device (210). For example, a mail client, such as Microsoft Outlook 2007, can be installed on the client device and configured with a profile for the user.

Conversely, if a basic configuration is specified, then the client device determines if a supported client application is already installed on the client device (212). For example, the configuration data 120 may specify a plurality of supported client applications, such as other mail client applications, or the same client application that is installed during a complete configuration (e.g., Outlook 2007, Outlook 2003, Outlook express, Windows Mail, Live Mail, etc.).

If a supported client application is installed, then the client device automatically configures the supported client application (214). In some implementations, the supported application can be other client applications that have the same functionality as the client application that is installed during the complete configuration. For example, a basic mail account may be added to a pre-existing mail client application on the client device. The basic mail account can correspond to a simple POP3 mail account, specifying the user name, password, and the mail server address.

If a supported client application is not installed, the client device performs a secondary configuration process (216). In some implementations, the secondary configuration process provides user instructions to configure plurality of second client applications. For example, a secondary configuration process can provide user instructions for configuring a POP3 mail account, or configuring one of a plurality of freely available web e-mail accounts.

In some implementations, the secondary configuration process can be an installation of the client application that is installed in the complete configuration. The installation can, for example, be subject to an approval by the enterprise 110, as such installation may incur a per seat license fee. Other secondary configuration processes can also be used.

Finally, if unauthenticated response data is received at the client device, then the client device precludes a configuration of a client application (218). For example, a notice can be provided on the client device display indicating that the identification data for the user was not authenticated, or that the user was authenticated but is not authorized to have the client application installed or have a pre-existing client application configured.

Figure 3:
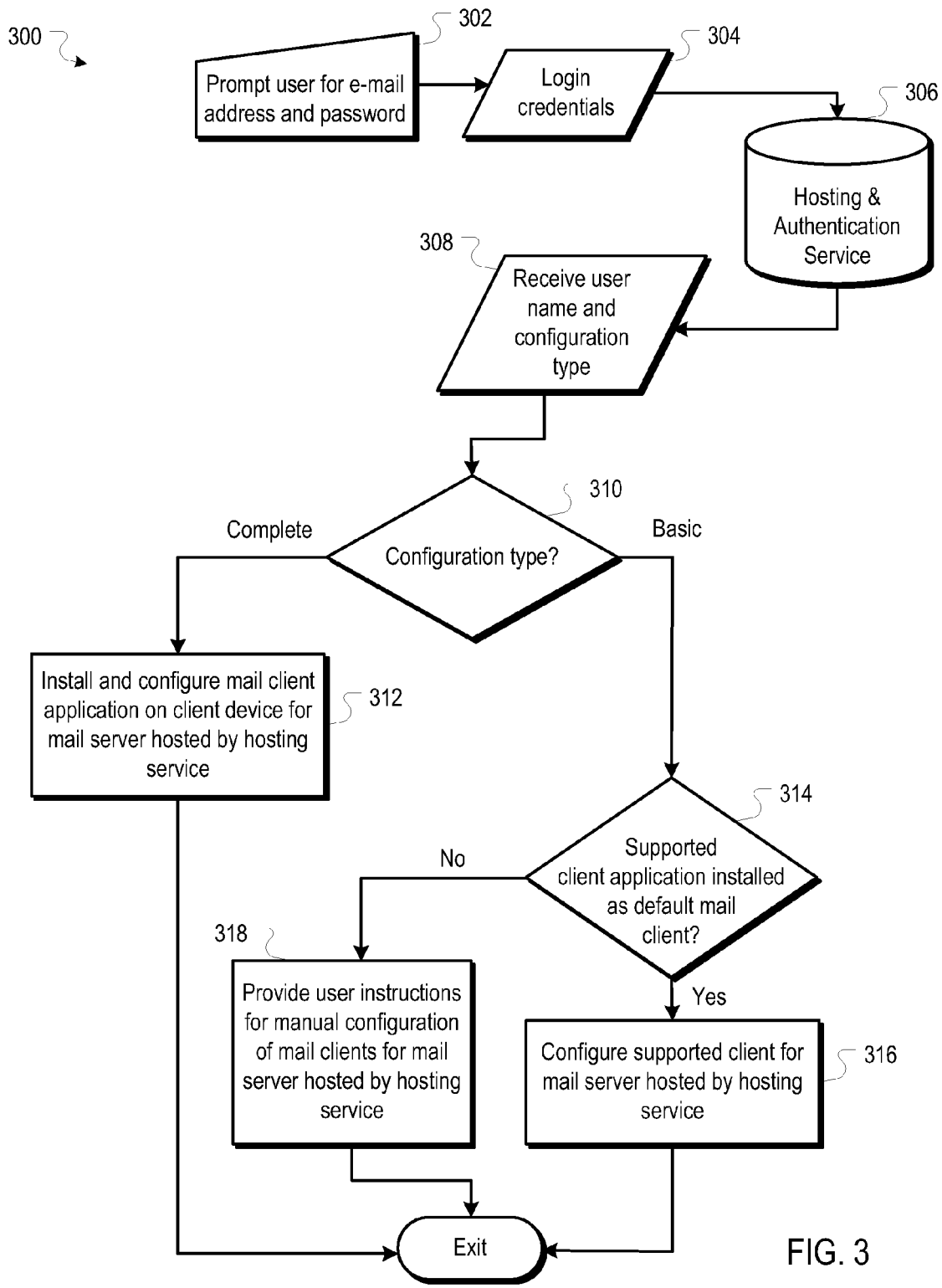
FIG. 3 is a flow diagram of an example process for installing and/or configuring mail client applications on a client device.

FIG. 3 is a flow diagram of an example process 300 for installing and/or configuring mail client applications on a client device. As with FIG. 2, portions of the process 300 take place on a client device, while other portions take place at a hosting and authentication service. The process 300 is directed to the configuration of a mail client application.

The client device prompts the user for an e-mail address and password (302). The e-mail address and password can, for example, be an e-mail address and password assigned to a user when the enterprise 110 secures the hosting services of the provider 130.

Login credentials are received at the client device (304), and provided to the hosting authentication service (306). The hosting authentication service checks login credentials to determine if the login credentials correspond to an authorized user. If the login credentials correspond to an authorized user, and the hosting authentication service sends an e-mail username and configuration type to the client device, and the client device receives the user name and associates it with the login credentials (308).

The client device then determines whether the configuration type is a basic configuration or complete configuration (310). If the configuration is a complete configuration, the client device installs and configures a mail client application on the client device for mail server hosted by the hosting service 130. In some implementations, the client instructions 122 can cause the client device to determine whether a copy of the most current version of the mail client application that is installed during a complete configuration is currently installed on the client device. If so, then installation of the client application is omitted, an existing client application is configured. For example, if the client application that is installed during the complete installation as Microsoft Outlook 2007, and the client device detects that the most current version of this application is already installed, then only a mail profile is configured on the client device.

If the configuration is a basic configuration, then the client determines if a supported mail client application is installed as the default mail client on the client device (314). For example, the client instructions can cause the client device to determine if one or more client applications specified by the configuration data 120 are installed on the client device.

If a supported mail client application is installed as the default mail client on the client device, then the client device is configured to support a client application for mail server hosted by the hosting service 130. For example, the default mail client may be configured with a POP3 mail account for the hosted mail server 150.

Conversely, if the client device does not have a supported mail client application installed, then the client device provides user instructions for manual configuration of mail client applications before the mail server 150. For example, instructions can be provided for downloading free mail client applications and manually configuring a POP3 account, and/or for manually configuring one of several freely available webmail accounts.

Figure 4:
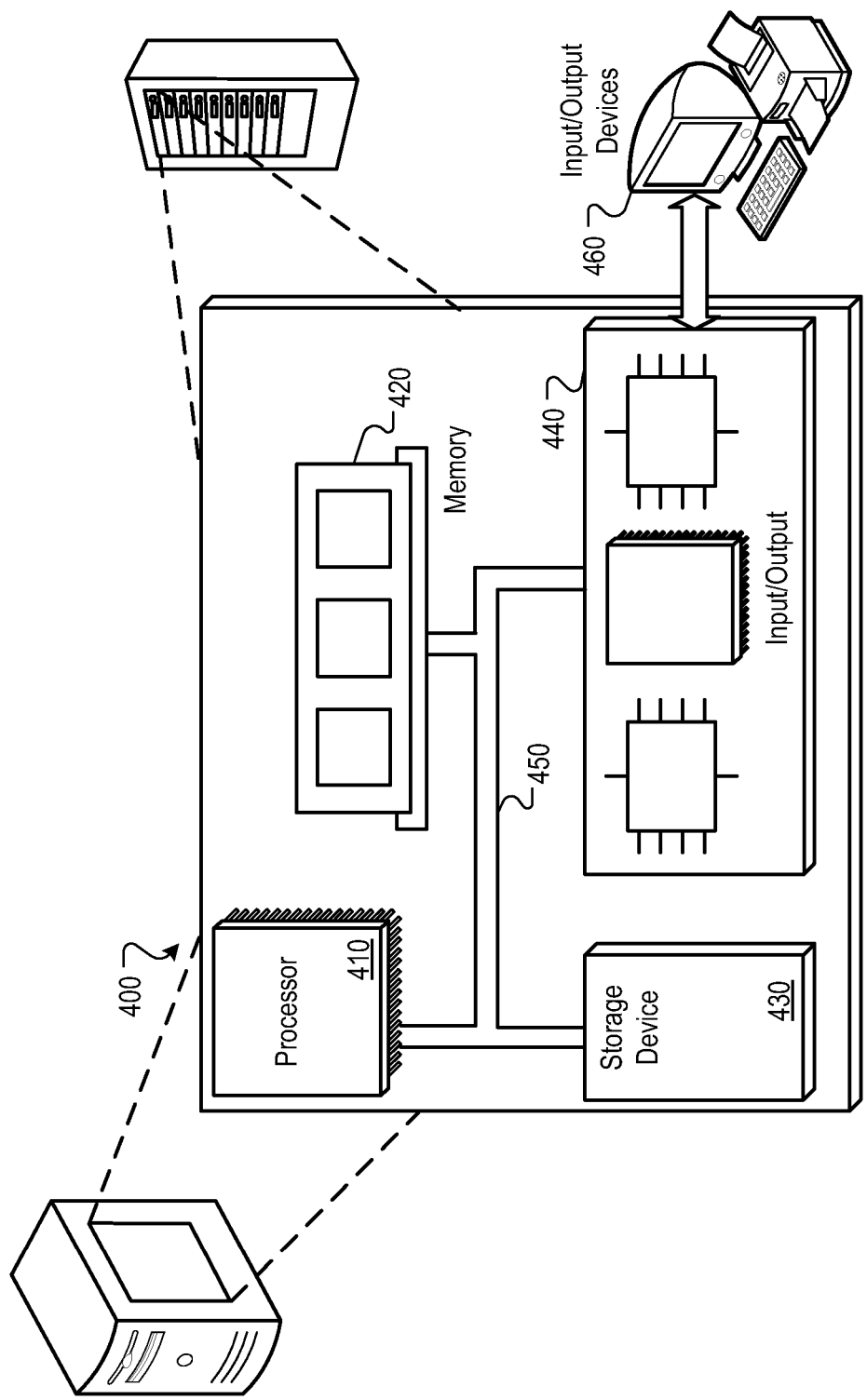
FIG. 4 is block diagram of an example computer architecture.

FIG. 4 is block diagram of an example computer architecture 400. The architecture 400 can be used to implement client devices and server devices. The architecture 400 includes a processor 410, a memory 420, a storage device 430, and an input/output device 440. Each of the components 410, 420, 430, and 440 can be interconnected, for example, using a system bus 450. The processor 410 is capable of processing instructions for execution. In one implementation, the processor 410 is a single-threaded processor. In another implementation, the processor 410 is a multi-threaded processor. The processor 410 is capable of processing instructions stored in the memory 420 or on the storage device 430.

The memory 420 stores digital information. In one implementation, the memory 420 is a computer-readable medium. The memory 420 can include a volatile memory unit and non-volatile memory unit.

The storage device 430 is capable of providing mass storage. In various different implementations, the storage device 430 can include, for example, a hard disk device, an optical disk device, or some other large capacity storage device.

The input/output device 440 provides input/output operations. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460.

As described above, embodiments of the subject matter described in this specification are implemented in a computing system that includes a back end component, e.g., as a data server, and that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., the Internet.

A computer program (also known as a program, instructions, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An apparatus, comprising:
    a storage device that stores client configuration data, the client configuration data specifying configuring of client applications according to a plurality of client application configurations, each client application configuration associated with a corresponding user identifier;
    a memory that encodes client instructions that are executable by a client device, and operable to cause the client device to perform operations comprising:
        receive user identification data at the client device, the user identification data specifying a user identifier;
        send the user identification data to an authentication server;
        receive configuration specification data from the authentication server, the configuration specification data specifying:
            a client application configuration associated with the user identifier specified by the user identification data, the specified client application configuration indicating whether the client application configuration is a first configuration or a second configuration for the client device, the first configuration specifying installation and configuration of a first client application on the client device, the second configuration specifying installation and configuration of any one of a plurality of supported second client applications on the client device, each of the plurality of supported second client applications having the same functionality of the first client application, and each of the plurality of supported second client applications being a different application from the first client application;
        the received configuration specification data used to determine whether the specified client application configuration is the first configuration or the second configuration;
        in response to determining that the specified client application configuration is the first configuration, install and configure the first client application on the client device; and
        in response to determining that the specified client application configuration is the second configuration:
            determine whether the client device has one of the plurality of supported second client applications installed on the client device; and
            in response to determining that the client device has one of the plurality of supported second client applications installed on the client device, configure the supported second client application installed on the client device.

2. The apparatus of claim 1, wherein the client instructions further cause the client device to perform operations comprising:

in response to determining that the specified client application configuration is the second configuration and in response to determining that the client device does not have one of the plurality of supported second client applications installed on the client device, providing user instructions to configure at least one of the plurality of second client applications.

3. The apparatus of claim 1, further comprising:
a data store storing associations of user identifiers and client application configurations;
wherein the authentication server is in data communication with the data store and configured to perform operations comprising:
receive the user identification data sent from the client device;
authenticate the user identifier specified by the user identification data and in response to authenticating the user identifier, select an associated client application configuration;
generate the configuration specification data specifying a client application configuration associated with the user identification data; and
send the configuration specification data to the client device.

4. The apparatus of claim 1, wherein the client applications are mail client applications.

5. The apparatus of claim 1, wherein the client instructions further cause the client device to perform operations comprising:
in response to determining that the specified client application configuration is the second configuration and in response to determining that the client device does not have one of the plurality of supported second client applications installed on the client device, install and configure the first client application on the client device.

6. The apparatus of claim 1, wherein the client instructions further cause the client device to perform operations comprising:
in response to determining that the specified client application configuration is the second configuration and in response to determining that the client device does not have one of the plurality of supported second client applications installed on the client device:
requesting, from an entity associated with the client device, authorization to install the first client application on the client device; and
in response to receiving the requested authorization, installing and configuring the first client application on the client device.

7. A system, comprising:
a storage device that stores client configuration data, the client configuration data specifying configuring of client applications according to a first configuration and a second configuration, the first configuration being different from the second configuration, and each configuration associated with corresponding user identifiers;
a memory that encodes client instructions that are executable by a client device, and operable to cause the client device to perform operations comprising:
receive user identification data at the client device, the user identification data specifying a user identifier;
send the user identification data to an authentication server;
receive configuration specification data from the authentication server, the configuration specification data specifying:
a client application configuration associated with the user identifier specified by the user identification data, the specified client application configuration indicating whether the client application configuration is the first configuration or the second configuration for the client device, the first configuration specifying installation and configuration of a first mail client application on the client device, the second configuration specifying installation and configuration of any one of a plurality of supported second mail client applications on the client device, each of the plurality of supported second mail client applications having the same functionality of the first mail client application, and each of the plurality of supported second mail client applications being a different mail client application than the first mail client application;
the received configuration specification data used to determine whether the specified client application configuration is the first configuration or the second configuration;
in response to determining that the specified client application configuration is the first configuration, install the first mail client application on the client device using client installation files; and
in response to determining that the specified client application configuration is the second configuration:
determine whether the client device has one of the supported second mail client applications installed on the client device;
in response to determining that the client device has one of the supported second mail client applications installed on the client device, configure a mail account associated with the user identifier on the client device so that the supported second mail client application installed on the client device can communicate with a mail server having an account associated with the user identification data;
a data store storing associations of user identifiers and client application configurations;
an authentication server in data communication with the data store and configured to perform operations comprising:
receive the user identification data sent from the client device;
authenticate the user identifier specified by the user identification data and in response to authenticating the user identifier, select an associated client application configuration;
generate the configuration specification data specifying a client application configuration associated with the user identification data; and
send the configuration specification data to the client device.

8. The system of claim 7, wherein the client configuration data includes installation files for the first mail client application, and wherein the operation of installing the first mail client application on the client device using client installation files further comprises:
configure the first mail client application to communicate with a mail server having an account associated with the user identification data.

9. The system of claim 8, wherein the client instructions further cause the client device to perform operations comprising:

in response to determining that the specified client application configuration is the second configuration and in response to determining that the client device does not have one of the supported second mail client applications installed on the client device:
  install the first mail client application on the client device using the client installation files; and
  configure the first mail client application to communicate with a mail server having an account associated with the user identification data.

10. The system of claim 7, wherein the client instructions further cause the client device to perform operations comprising:
  in response to determining that the specified client application configuration is the second configuration and in response to determining that the client device does not have one of the supported second mail client applications installed on the client device, provide user instructions to configure at least one of the plurality of supported second mail client applications.

11. The system of claim 7, wherein the operation of installing the first mail client application on the client device using the client installation files further comprises:
  request and receive client installation files for a first mail client application from the authentication server;
  install the first mail client application on the client device using the client installation files; and
  configure the first mail client application to communicate with a mail server having an account associated with the user identification data.

12. The system of claim 11, wherein the client instructions further cause the client device to perform operations comprising:
  in response to determining that the specified client application configuration is the second configuration and in response to determining that the client device does not have one of the supported second mail client applications installed on the client device, provide user instructions to configure at least one of the plurality of supported second mail client applications.

13. The system of claim 7, wherein the user identifier specifies a user type.

14. The system of claim 7, wherein the user identifier specifies a user.

15. A method, comprising:
  at a client device:
    receiving user identification data at the client device, the user identification data specifying a user identifier;
    sending the user identification data to an authentication server;
    receiving configuration specification data from the authentication server, the configuration specification data specifying:
      a client application configuration associated with the user identifier, the specified client application configuration indicating whether the client application configuration is a first configuration or a second configuration for the client device, the first configuration specifying installation and configuration of a first client application on the client device, the second configuration specifying installation of any one of a plurality of supported second client applications on the client device, each of the supported second client applications having the same functionality of the first client application, and each of the plurality of supported second client applications being a different application from the first client application;
    wherein the configuration specification data is used to determine whether the specified client application configuration is the first configuration or the second configuration;
    in response to determining that the specified client application configuration is the first configuration, install and configure the first client application on the client device; and
    in response to determining that the specified client application configuration is the second configuration:
      determine whether the client device has one of the supported second client applications installed on the client device;
      in response to determining that the client device has one of the supported second client applications installed on the client device, configure the supported second client application on the client device.

16. The method of claim 15, further comprising, at the client device, providing user instructions to configure at least one of the plurality of supported second client applications in response to determining that the specified client application configuration is the second configuration and in response to determining that the client device does not have one of the plurality of supported second client applications installed on the client device.

17. The method of claim 15, further comprising:
  at an authentication server:
    receiving the user identification data sent from the client device;
    authenticating the user identifier specified by the user identification data and in response to authenticating the user identifier, selecting an associated client application configuration;
    generating the configuration specification data specifying a client application configuration associated with the user identification data; and
    sending the configuration specification data to the client device.

18. The method of claim 15, wherein the first client application and the supported second client applications are mail client applications.

* * * * *

UNITED STATES PATENT AND TRADEMARK OFFICE
CERTIFICATE OF CORRECTION

PATENT NO. : 8,219,652 B2  
APPLICATION NO. : 12/369185  
DATED : July 10, 2012  
INVENTOR(S) : Gregory Patrick Newton, Ryan Robert Dawe and Jonathan Aubrey Harmer It is certified that error appears in the above-identified patent and that said Letters Patent is hereby corrected as shown below:

On the Title page:

Item (73), (Assignee), – delete "Communcations," and insert
-- Communications, --, therefor.

Item (56), (U.S. Patent Documents), – delete "Welch et al." and insert
-- McGuire et al. --, therefor.

Signed and Sealed this
Eighteenth Day of September, 2012

David J. Kappos
*Director of the United States Patent and Trademark Office*